United States Patent [19]
Jones et al.

[11] Patent Number: 5,909,065
[45] Date of Patent: Jun. 1, 1999

[54] MULTI-STAGE PRECHARGING SYSTEM TO LIMIT POWER SUPPLY TRANSIENTS WHEN PRINTED CIRCUIT BOARDS ARE PLUGGED IN

[75] Inventors: James Jones; Jason W. Dove, both of Novato, Calif.

[73] Assignee: DSC Telecom L.P., Plano, Tex.

[21] Appl. No.: 08/996,893

[22] Filed: Dec. 23, 1997

[51] Int. Cl.⁶ ..................................................... H02H 7/20
[52] U.S. Cl. ............................ 307/147; 361/58; 361/111; 361/788; 361/791; 439/924.1
[58] Field of Search ..................... 307/147, 42; 395/283; 361/58, 111, 748, 791, 788, 9; 439/924.1

[56] References Cited

U.S. PATENT DOCUMENTS

| | | | |
|---|---|---|---|
| 3,993,935 | 11/1976 | Phillips et al. | 439/924.1 |
| 4,079,440 | 3/1978 | Ohnuma et al. | 361/58 |
| 4,245,270 | 1/1981 | Busby | 361/58 |
| 5,210,855 | 5/1993 | Bartol | 395/283 |
| 5,384,492 | 1/1995 | Carlson et al. | 307/147 |
| 5,530,810 | 6/1996 | Bowman | 395/283 |
| 5,726,506 | 3/1998 | Wood | 307/147 |

*Primary Examiner*—Albert W. Paladini
*Attorney, Agent, or Firm*—Fliesler, Dubb, Meyer & Lovejoy

[57] ABSTRACT

A system for limiting power supply transients in a powered up backplane when a printed circuit (PC) board is plugged in. The PC board includes first connecting pins with different lengths connecting to precharge planes on the backplane where each sequentially longer pin length is connected to a precharge plane providing a sequentially lower voltage. The first connecting pins are further connected by precharge circuits to power planes on the PC board. The precharge circuits are configured to ramp current to minimize power supply transients. In one embodiment, the precharge circuits each include a transistor and RC circuit connecting each first connecting pin to a power plane on the PC board.

15 Claims, 3 Drawing Sheets

MULTI-STAGE PRECHARGING SYSTEM TO LIMIT POWER SUPPLY TRANSIENTS WHEN PRINTED CIRCUIT BOARDS ARE PLUGGED IN

BACKGROUND OF THE INVENTION

1. Field of the Invention

The present invention relates to circuitry for limiting power transients when printed circuit (PC) boards are plugged into a powered up system. More particularly, the present invention relates to such circuitry utilized with PC boards which plug into a telephone signal distribution bank.

2. Description of the Background Art

A signal distribution bank used by telephone companies includes shelves or slots on a backplane for connecting PC boards, the PC boards which plug in include "multiplexer" cards for switching signals provided to the distribution bank, and "distribution" cards, for transferring signals from the distribution bank to remote users or subscribers. With such signal distribution banks, telephone companies can start with only a few PC board slots occupied and later fill in the remainder. One such signal distribution bank is the Litespan® LS2012 manufactured by DSC Communications Corporation, Plano Tex.

With PC boards including circuitry to continually switch telephone signals after installation, it is not desirable to shut down a signal distribution bank to install additional PC boards. With the signal distribution bank powered up when a new PC board is installed, power transients can be created in the power supply of a backplane where the PC board is inserted. Such power transients can cause erroneous signals to be provided by sensitive analog components on PC boards already installed on the backplane.

SUMMARY OF THE INVENTION

The present invention limits power supply transients by precharging power planes on a PC board in stages when a PC board is plugged into a powered up backplane.

The present invention includes components in a backplane and PC board to limit power supply transients. A PC board of the present invention includes first connecting pins with different lengths for connecting to precharge planes on the backplane, where each sequentially longer pin length is connectable to a precharge plane providing a sequentially lower voltage. The pins on the PC board connect through precharge circuits to power planes on the PC board. The precharge circuits function to ramp current provided to the power planes on the PC board to minimize power supply transients. With lengths of first connecting pins set so that lower voltages are connected first, power supply transients are further minimized. The PC board further includes second connecting pins with lengths shorter than the first pins for connecting to power planes on the backplane separately from the precharge planes. The second pins having shorter lengths than the first pins which connect to precharge planes will provide power to the power planes of the PC board after the power planes of the PC board are precharged.

In one embodiment, the precharge circuits include resistors each connecting a first pin to a power plane on the PC board. In another embodiment, the precharge circuits include a transistor having a source to drain path connecting a first pin to a power plane on the PC board, and having a gate coupled through an RC circuit to the first pin.

BRIEF DESCRIPTION OF THE DRAWINGS

Further details of the present invention are explained with the help of the attached drawings in which.

DETAILED DESCRIPTION

Figure 1:
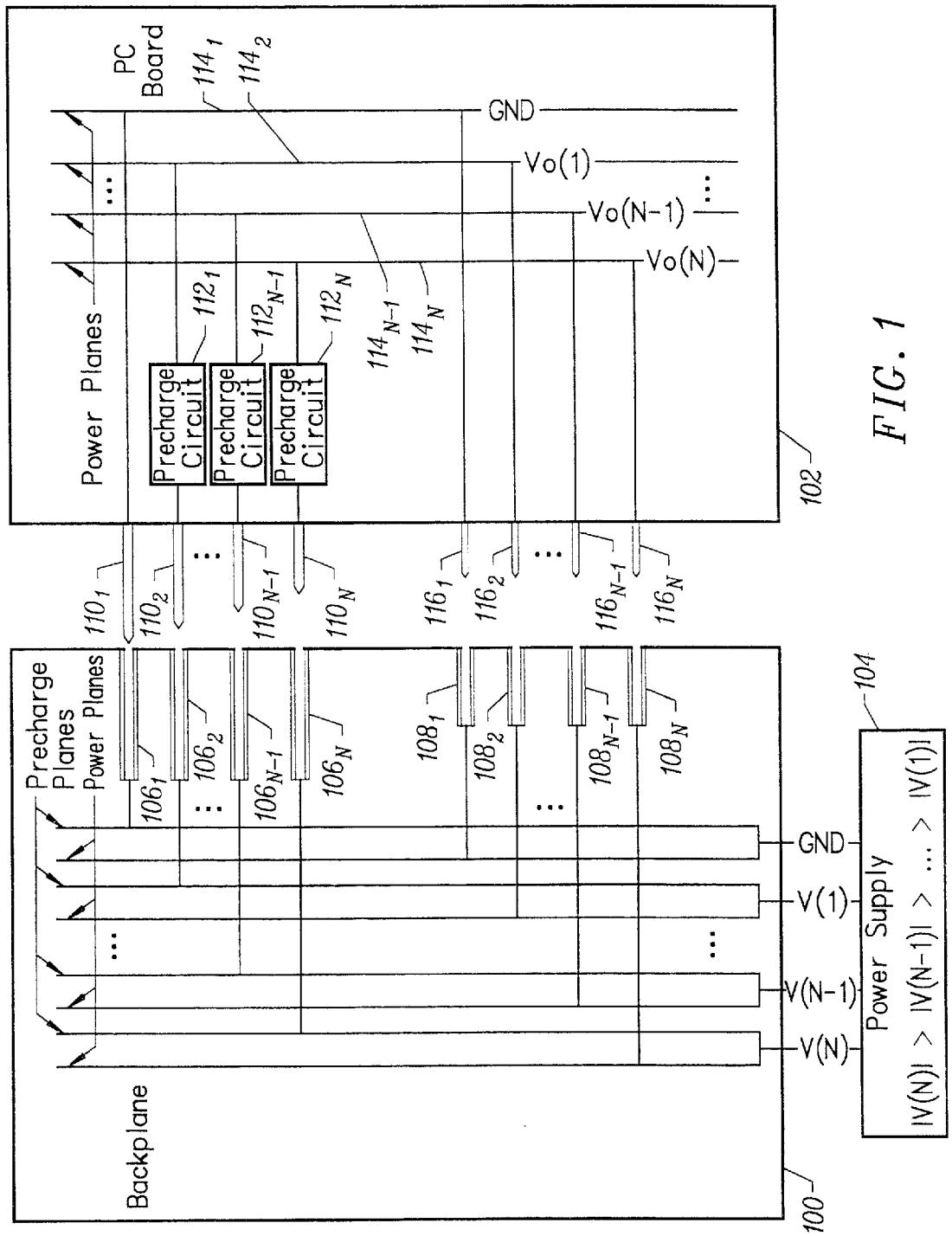
FIG. 1 illustrates components of the present invention included in a backplane and PC board.

FIG. 1 illustrates components of the present invention included in a backplane 100 and PC board 102. As shown, the backplane is connected to a power supply 104. The power supply 104 provides a ground connection, as well as voltage potential connections V(1)–V(N). Each sequentially higher voltage connection in V(1)–V(N) provides a higher voltage potential than its predecessor. The voltage potentials of V(1)–V(N), for example, can be a gunning transceiver logic (GTL) high of 1.2 volts, a low voltage transistor transistor logic (LVTTL) high of 3.3 volts and a 5 volt conventional logic high. With PC boards such as 102 typically including separate GTL logic chips, LVTTL chips, and conventional logic chips, such voltages will be typically required from a power supply.

To each voltage potential connection V(1)–V(N) and the ground connection of the power supply 104 is connected a separate power plane and a precharge plane on the backplane 100. A connection from each precharge plane on the backplane 100 is provided to one of sockets $106_1$–$106_N$. A connection from each power plane on the backplane 100 is provided to one of sockets $108_1$–$108_N$.

The PC board 102 includes pins $110_1$–$110_N$ which mate with respective ones of sockets $106_1$–$106_N$ which connect to precharge planes on the backplane 100. The pin $110_1$ which connects to the precharge plane providing ground from the power supply 104 is connected directly to a ground plane $114_1$ on the PC board 102. The length of pin $110_1$ is longer than all of pins $110_2$–$110_N$ so that the ground connection is made first when the PC board 102 is plugged into the backplane 100.

The pins $110_2$–$110_N$ each have a sequentially shorter length and connect to a precharge plane of the backplane 100 providing a sequentially higher voltage. The pins $110_2$–$110_N$ are each connected through precharge circuits $112_1$–$112_N$ to respective power planes $114_2$–$114_N$ on the PC board 102. The precharge circuits $112_1$–$112_N$ include components described subsequently to gradually increase voltage on the power planes of the PC board 102 to minimize power supply transients. Further, with the pins $110_1$–$110_N$ having different lengths so that lower voltage potentials are connected before higher voltage potentials, the load on power supply 104 will be gradually increased to minimize power supply transients.

The PC board 102 further includes pins $116_1$–$116_N$ which mate with respective sockets $108_1$–$108_N$ which connect to power planes on the backplane 100. The pins $116_1$–$116_N$ are each connected directly by a line to a respective power plane $114_1$–$114_N$ on the PC board 102. The length of each of pins $116_1$–$116_N$ is less than the length of any of pins $110_1$–$110_N$ so that when the PC board 102 is plugged into the backplane 100, the power planes $114_1$–$114_N$ will be charged up to a desired voltage potential by precharge planes on the backplane 100 before being connected to the power planes on the backplane 100. Voltage transients on the power planes of the backplane will, thus, be minimized.

Figure 2:
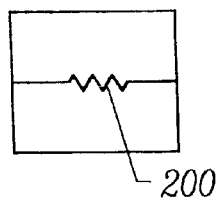
FIG. 2 shows a first embodiment of circuitry for each of the precharge circuits of FIG. 1.
Figure 3:
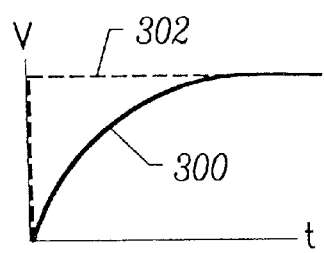
FIG. 3 illustrates how voltage on a power plane is ramped by a precharge circuit of the first embodiment.

FIG. 2 shows a first embodiment of circuitry for each of the precharge circuits $112_1$–$112_N$ of FIG. 1. As shown, the precharge circuit simply includes a resistor 200. The resistor 200 along with the PC board bulk capacitance make an RC circuit. With voltage applied from a power supply pin to resistor 200, voltage on a power plane driven by the resistor 200 will charge up in a gradual manner as shown by curve 300 of FIG. 3, as opposed to dashed curve 302. With voltage ramping as shown by curve 300, as opposed to curve 302, less of an instantaneous load will be applied to power supply 104 to cause power supply transients affecting PC boards already plugged in.

Figure 4:
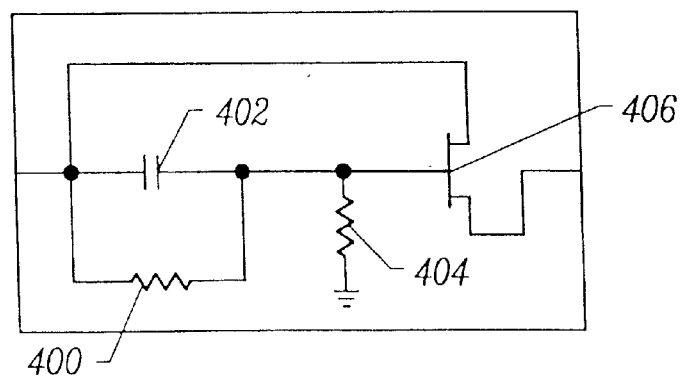
FIG. 4 shows a second embodiment of circuitry for each of the precharge circuits of FIG. 1.

FIG. 4 shows an alternative embodiment of circuitry for each of the precharge circuits $112_1$–$112_N$ of FIG. 1. As shown, the precharge circuit of FIG. 4 includes a resistor 400 and capacitor 402 connected in parallel connecting the input of the precharge circuit to the gate of field effect transistor (FET) 406. A resistor 404 is further connected from the gate of transistor 406 to ground. A direct connection is made from the input of the precharge circuit of FIG. 4 to the source of transistor 406, while the source of transistor 406 provides the output of the precharge circuit of FIG. 4.

Figure 5:
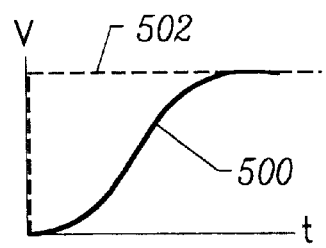
FIG. 5 illustrates how voltage on a power plane is ramped by a precharge circuit of the present invention.

In operation, the output current at the drain of transistor 406 is controlled by the gate to source voltage of the transistor 406. Capacitor 402, resistor 404, and resistor 400 make an RC circuit which controls the gate to source voltage of transistor 406 in such a manner as to initially turn off the transistor when the precharge voltage is applied to the source, then gradually turn on the transistor, at a rate determined by the RC circuit, to obtain a steady state drain current set by the resistive divider of resistor 400 and resistor 404. The steady state drain current charges the bulk capacitance of the power plane which ramps the voltage of the power plane up to nearly the voltage of the precharge plane. The voltage on a power plane driven by the drain of transistor 406 will charge up as shown by curve 500 of FIG. 5, as opposed to curve 502.

Figure 6:
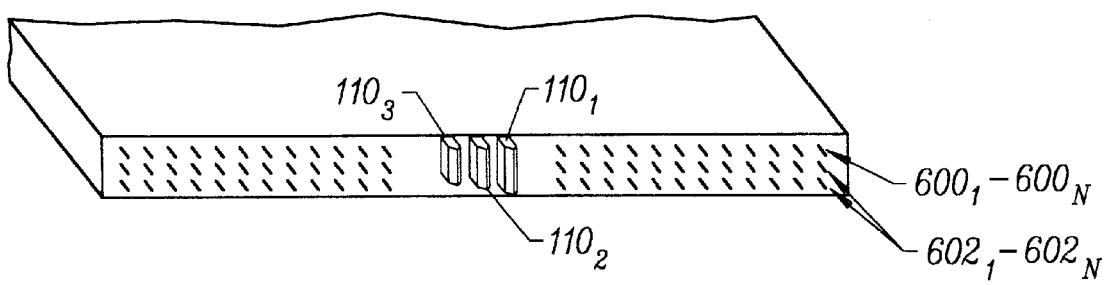
FIG. 6 shows a configuration of pins provided on a PC board of the present invention.

FIG. 6 shows a configuration of pins provided on a PC board of the present invention. The pins include precharge pins $110_1$–$110_3$ with sequentially shorter lengths, similar to the precharge pins $110_1$–$110_N$ illustrated in FIG. 1. The PC board of FIG. 6 further includes power plane connection pins $600_1$–$600_N$ which directly connect to power planes on the PC board, similar to pins $116_1$–$116_N$ of FIG. 1. However, in FIG. 6 the power pins $600_1$–$600_N$ are greater in number than precharge pins $110_1$–$110_3$ because individual pins $600_1$–$600_N$ cannot carry sufficient current. Groups of pins $600_1$–$600_N$ are connected to each power plane on the PC board to enable sufficient current flow. The precharge pins $110_1$–$110_3$ are shaped like tabs with a width on the order of 10 times greater than the diameter of one of pins $600_1$–$600_N$ to enable an individual one of pins $110_1$–$110_3$ to carry sufficient current to a power plane of the PC board. The PC board of FIG. 6 further includes pins $602_1$–$602_N$ for providing signal connections to and from components on the PC board separate from power supply connections.

Although the present invention has been described above with particularity, this was merely to teach one of ordinary skill in the art how to make and use the invention. Many other modifications will fall within the scope of the invention, as that scope is defined by the claims provided below.

For example, instead of pins being provided on the PC boards and sockets being provided on the backplanes, as shown in FIG. 1, the pins could be provided on the backplane and sockets provided on the PC boards. The pin lengths on the backplane could still be controlled so that ground is connected first, then the lowest voltage pin, and so on until all pins are connected.

What is claimed is:

1. A printed circuit (PC) board comprising:
   first connecting pins for connecting to first sockets on a backplane, each first socket providing one of N voltage potentials, wherein the first connecting pins each have a length inversely related to the one of the N voltage potentials to which it is connectable;
   power planes;
   precharge circuit means connecting the first connecting pins to the power planes, the precharge circuit means limiting current variations when the first connecting pins are connected to the first sockets; and
   second connecting pins having lengths shorter than the first connecting pins, the second connecting pins for connecting to second sockets on the backplane, each second socket providing one of the N voltage potentials, each second connecting pin being connected to one of the power planes.

2. The PC board of claim 1, wherein the precharge circuit means comprise resistors, each resistor connecting one of the first connecting pins to one of the power planes.

3. The PC board of claim 1, wherein each one of the precharge circuit means comprises:
   a transistor having a drain connected to one of the first connecting pins, a source connected to one of the power planes, and having a gate; and
   an RC means connecting the drain to the gate of the transistor.

4. The PC board of claim 3, wherein each RC means comprises a resistor and capacitor connected in parallel.

5. The PC board of claim 4, wherein each RC means further comprises a resistor connected from the gate of the transistor to a ground.

6. An apparatus for limiting power supply transients comprising:
   a backplane comprising:
      a power supply having outputs providing N voltage potentials;
      precharge power planes, each connected to one of the outputs of the power supply;
      backplane power planes, each connected to one of the outputs of the power supply;
      first connecting pins each connected to one of the precharge power planes, wherein the first connecting pins each have a length inversely related to one of the N voltage potentials to which it is connected; and
      second connecting pins having lengths shorter than the first connecting pins each connected to one of the backplane power planes; and
   a printed circuit (PC) board comprising:
      first connecting sockets for connecting to the first connecting pins of the backplane;
      PC board power planes;
      precharge circuit means connecting the first connecting sockets to the PC board power planes, the precharge circuit means limiting current variations when the first connecting sockets are connected to the first connecting pins; and
      second connecting sockets each for connecting to one of the second connecting pins, and each second connecting socket being connected to one of the PC board power planes.

7. The apparatus of claim 6, wherein the precharge circuit means comprise resistors, each resistor connecting one of the first connecting sockets to one of the PC board power planes.

8. The apparatus of claim 6, wherein each one of the precharge circuit means comprises:
- a transistor having a drain connected to one of the first connecting sockets, a source connected to one of the PC board power planes, and having a gate; and
- an RC means connecting the drain to the gate of the transistor.

9. The apparatus of claim 8, wherein each RC means comprises a resistor and capacitor connected in parallel.

10. The PC board of claim 9, wherein each RC means further comprises a resistor connected from the gate of the transistor to a ground.

11. An apparatus for limiting power supply transients comprising:
- a backplane comprising:
  - a power supply having outputs providing N voltage potentials;
  - precharge power planes, each connected to one of the outputs of the power supply;
  - backplane power planes, each connected to one of the outputs of the power supply;
  - first connecting sockets each connected to one of the precharge power planes; and
  - second connecting sockets each connected to one of the backplane power planes; and
- a printed circuit (PC) board comprising:
  - first connecting pins for connecting to the first connecting sockets of the backplane, wherein the first connecting pins each have a length inversely related to one of the N voltage potentials to which it is connectable;
  - PC board power planes;
  - precharge circuit means connecting the first connecting pins to the PC board power planes, the precharge circuit means limiting current variations when the first connecting pins are connected to the first sockets; and
  - second connecting pins having lengths shorter than the first connecting pins, the second connecting pins each for connecting to one of the second connecting sockets, and each second connecting pin being connected to one of the PC board power planes.

12. The apparatus of claim 11, wherein each one of the precharge circuit means comprises:
- a transistor having a drain connected to one of the first connecting pins, a source connected to one of the PC board power planes, and having a gate; and
- an RC means connecting the drain to the gate of the transistor.

13. The apparatus of claim 12, wherein each RC means comprises a resistor and capacitor connected in parallel.

14. The PC board of claim 13, wherein each RC means further comprises a resistor connected from the gate of the transistor to a ground.

15. A method for limiting power supply transients comprising the steps of:
- connecting first contacts on a printed circuit (PC) board to precharge plane contacts on a backplane so that the precharge plane contacts are connected sequentially in an order of voltage potential provided from each of the precharge plane contacts from a lowest voltage potential to a highest voltage potential, the first contacts providing current to power planes on the PC board;
- limiting current variations in current provided from the first contacts to the power planes on the PC board when the first contacts are connected to the precharge plane contacts on the backplane; and
- connecting second contacts on the PC board to power plane contacts on the backplane after the precharge plane contacts on the backplane have been connected to the first contacts on the PC board, the second contacts providing current to the power planes on the PC board.

* * * * *